US005590687A

United States Patent [19]
Vaughan

[11] Patent Number: 5,590,687
[45] Date of Patent: Jan. 7, 1997

[54] CONTROL MECHANISM FOR A WATER CONDITIONING SYSTEM

[75] Inventor: Don D. Vaughan, Brookfield, Wis.

[73] Assignee: Fleck Controls, Inc., Brookfield, Wis.

[21] Appl. No.: 484,455

[22] Filed: Jun. 7, 1995

[51] Int. Cl.⁶ ............................ G05B 19/06; G04C 23/26
[52] U.S. Cl. .................. 137/624.13; 137/624.15; 210/190
[58] Field of Search ............... 137/624.13, 624.15; 216/143, 190, 191

[56] References Cited

U.S. PATENT DOCUMENTS

| | | | |
|---|---|---|---|
| 3,211,179 | 10/1965 | Lilly et al. | 137/624.15 |
| 3,426,603 | 2/1969 | Hiers et al. | 210/140 X |
| 3,616,820 | 11/1971 | Fleckenstein | 137/624.13 |
| 3,708,068 | 1/1973 | Tischler | 210/140 |
| 3,874,412 | 4/1975 | Fleckenstein et al. | 137/624.13 |
| 3,891,552 | 6/1975 | Prior | 210/88 |
| 3,976,101 | 8/1976 | Bassett | 137/624.15 |
| 4,210,532 | 7/1980 | Loke | 210/136 |
| 4,298,025 | 11/1981 | Prior | 137/624.14 |
| 4,313,825 | 2/1982 | Fleckenstein et al. | 210/190 |
| 4,380,251 | 4/1983 | Weaver . | |
| 4,632,150 | 12/1986 | Gagas . | |
| 4,764,280 | 8/1988 | Brown . | |
| 5,022,994 | 6/1991 | Avery . | |
| 5,273,070 | 12/1993 | Chili . | |
| 5,341,834 | 8/1994 | Doherty | 137/599.1 |

OTHER PUBLICATIONS

Model 9000 Econominder, pp. 8–11 of Fleck Controls brochure Fleck Controls Model 5000 Service Manual, Jan. 1995.

Primary Examiner—Edward K. Look
Assistant Examiner—Michael S. Lee
Attorney, Agent, or Firm—Lee, Mann, Smith, McWilliams, Sweeney & Ohlson

[57] ABSTRACT

A control mechanism is provided for operating a control valve in a water conditioning system. The control mechanism includes a timing mechanism for regulating the regeneration cycle and service cycle of the water conditioning system and a control valve positioning mechanism for operating the control valve of the water conditioning system. The control valve positioning mechanism and the timing mechanism are driven by a drive mechanism. The drive mechanism includes a timing drive gear which is in driving engagement with the timing mechanism and a control valve drive gear which is in driving engagement with the control valve positioning mechanism. A clutch selectively couples the control valve drive gear to the timing drive gear to provide selective conjoint rotation of the control valve drive gear with the timing drive gear. The clutch includes a coupling member having a first end wrapped around a stem of the timing drive gear and a second end wrapped around the stem of the control valve drive gear. When the timing drive gear is rotated the coupling member couples the control valve drive gear to the timing drive gear for conjoint rotation. However, when the clutch is selectively gripped by a pivotable cam arm, the control valve drive gear is uncoupled from the timing drive gear such that the timing drive gear rotates without any corresponding rotation of the control valve drive gear.

7 Claims, 4 Drawing Sheets

CONTROL MECHANISM FOR A WATER CONDITIONING SYSTEM

BACKGROUND OF THE INVENTION

The present invention is directed to a control mechanism which may be used advantageously for a water conditioning system, and in particular to a control mechanism having a control valve drive gear selectively coupled to a timing drive gear by a mechanical clutch.

Water conditioning or treatment devices of the ion exchange type, often referred to as water softeners, typically include a tank having a resin bed through which hard water passes to exchange its hardness causing ions of calcium and magnesium for the sodium ions of the regenerated resin bed. Regeneration of the resin bed is periodically required to remove the accumulation of hardness causing ions and to replenish the supply of sodium ions in the resin. A control mechanism operates a valve which controls the operation of the water conditioning device. The control valve selectively switches the water conditioning device between a service mode and a regeneration mode. The control valve also controls the various cycles the water treatment system undergoes during regeneration such as the start and stop of the backwash cycle, the brine and slow rinse cycle, the rapid rinse cycle and the brine tank refill cycle. Control mechanisms for water conditioning systems typically include electronic devices such as switches or microprocessors for controlling the valve of the water conditioning system. The present invention provides an inexpensive adjustable cycle control mechanism for controlling the operation of a water conditioning system.

SUMMARY OF THE INVENTION

A control mechanism is provided having a drive mechanism which operates the control valve of a water conditioning system. The control mechanism includes an electric motor having a rotatable drive shaft, a regeneration cycle timing mechanism which controls the operation and timing of the regeneration cycles, and a control valve positioning mechanism which controls the positioning of the control valve. The drive mechanism includes a timing drive gear adapted to be rotationally driven by the drive shaft. The timing drive gear includes a plurality of first gear teeth adapted to drive the regeneration cycle timing mechanism such that rotation of the timing drive gear provides operation of the timing mechanism. The timing drive gear also includes a first stem attached to the first gear teeth for conjoint rotation therewith. The drive mechanism also includes a control valve drive gear including a plurality of second gear teeth which are adapted to selectively drive the control valve positioning mechanism to provide for the selective operation of the service cycle and of the regeneration cycles. The control valve drive gear includes a second stem attached to the second gear teeth for conjoint rotation therewith. A clutch selectively couples the control valve drive gear to the timing drive gear to provide selective conjoint rotation of the control valve drive gear with the timing drive gear. The clutch comprises a coupling member, such as a coil spring, having a first end and a second end. The first end of the coupling member is wrapped around the first stem of the timing drive gear and the second end is wrapped around the second stem of the control valve drive gear. When the drive shaft rotates the timing drive gear in a first rotational direction, the first end of the coupling member becomes tightly wrapped around the first stem of the timing drive gear and the second end of the biasing member becomes tightly wrapped around the second stem of the control valve drive gear such that the coupling member couples the control valve drive gear to the timing drive gear for conjoint rotation. When the first end of the coupling member is prevented from rotating, the control valve drive gear is uncoupled from the timing drive gear such that the timing drive gear rotates without any corresponding rotation of the control valve drive gear.

DETAILED DESCRIPTION OF THE PREFERRED EMBODIMENT

Figure 1:
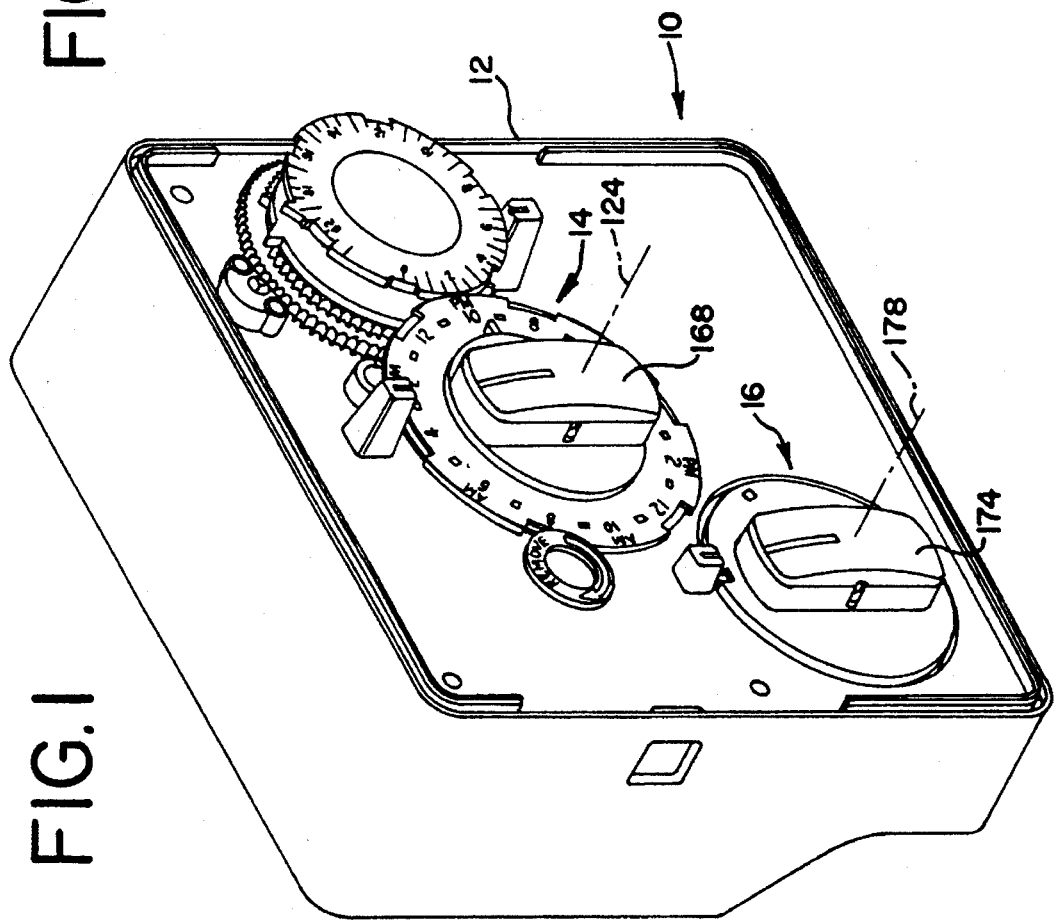
FIG. 1 is a perspective view of the exterior of the control mechanism of the present invention.

The present invention is a control mechanism 10, as best shown in FIG. 1, which controls the operation and positioning of a control valve 11 of a water conditioning and treatment system including a tank with a resin bed (not shown). Typical control valves and their operation are described in U.S. Pat. Nos. 4,313,825 and 4,290,451 which are assigned to Fleck Controls, Inc., the applicant herein, and which are hereby incorporated by reference. The control mechanism 10 includes a housing 12, a control valve positioning mechanism 14 and a regeneration cycle programming mechanism 16.

Figure 2:
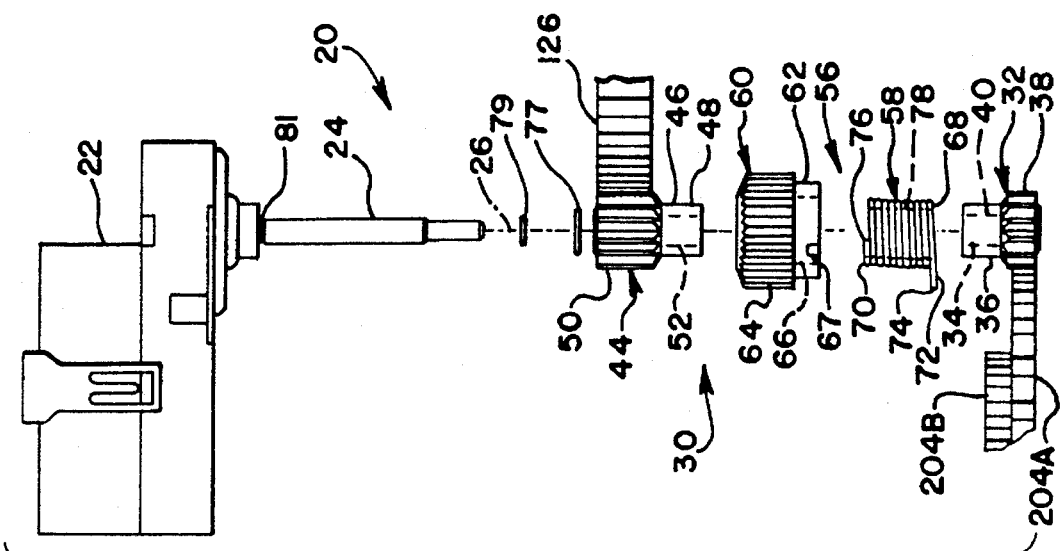
FIG. 2 is an exploded view of the drive mechanism of the control mechanism.

The control valve positioning mechanism 14 and the regeneration cycle programming mechanism 16 are driven by a drive assembly 20 which is illustrated in FIG. 2. The drive assembly 20 includes an electric motor 22 having a rotatable drive shaft 24. The electric motor 22 rotates the drive shaft 24 about a longitudinal axis 26. The drive assembly 20 also includes a drive mechanism 30. The drive mechanism 30 includes a timing drive gear 32 having a stem 34 with a generally cylindrical outer surface 36 and a gear 38 having a plurality of gear teeth located in a generally circular manner. The timing drive gear 32 includes a generally cylindrical bore 40. The tip of the drive shaft 24 is inserted into the bore 40 of the timing drive gear 32 such that the timing drive gear 32 is secured to the drive shaft 24 for conjoint rotation therewith by any of various means such as by pins, keys or splines. The drive mechanism 30 also includes a control valve drive gear 44 having a stem 46 with a generally cylindrical outer surface 48 and a gear 50 having a plurality of gear teeth. The gear 50 is attached to the stem 46 for conjoint rotation therewith. A generally cylindrical bore 52 extends through the control valve drive gear 44. The drive shaft 24 extends through the bore 52 such that the drive shaft 24 is rotatable within and with respect to the bore 52.

The drive mechanism 30 also includes a clutch arrangement 56 having a coupling member 58 and an actuating member 60. The actuating member 60 includes a stem 62 and a gear 64 having a plurality of gear teeth. A bore 66 extends through the actuating member 60. The stem 62 includes a slot 67 which extends between the bore 66 and the outer surface of the stem 62. The coupling member 58 includes a first end 68 and a second end 70. The coupling member 58 is formed by an elongate metallic wire 72 having a first tip 74 at one end and a second tip 76 at the other end thereof. The wire 72 is preferably generally rectangular in cross-section, although it may be circular or other shapes as desired. The wire 72 extends in a spiral manner between the tip 74 and the tip 76, forming a coil spring having a generally cylindrical bore 78 which extends between the first end 68 and the second end 70. The wire 72 rotates about the axis 26 in a generally clockwise direction as the wire extends from the tip 74 to the tip 76. The first tip 74 of the wire 72 projects outwardly from the coiled portion of the coupling member 58. The drive mechanism 30 is retained and positioned on the shaft 24 in part by a washer 77 and a retainer ring 79 which snaps into a detent 81 in the base of the shaft 24.

The coupling member 58 is located within the bore 66 of the actuating member 60 such that the first tip 74 of the coupling member 58 is located in the slot 67 whereby the first end 68 of the coupling member 58 is attached to the actuating member 60 for conjoint rotation therewith. The stem 34 of the timing drive gear 32 is inserted into the bore 78 of the coupling member 58 such that the first end 68 of the coupling member 58 wraps closely around the stem 34. The stem 46 of the control valve drive gear 44 is inserted into the bore 78 of the coupling member 58 such that the second end 70 of the coupling member 58 wraps closely around the stem 46. Rotation of the shaft 24 is in the counterclockwise direction when the motor 20 is powered, as viewed from below in FIG. 2. When the first end 68 of the coupling member 58 is held stationary by the actuating member 60, the coupling member 58 permits the timing drive gear 32 to rotate in the counterclockwise direction, as viewed from below as shown in FIG. 2, about the axis 26 as rotation of the timing drive gear 32 in the counterclockwise direction tends to uncoil the first end 68 of the coupling member 58 such that the coupling member 58 releases its grip on the stem 34. When the first end 68 of the coupling member 58 and the clutch 56 are freely rotatable, rotation of the timing drive gear 32 in the counterclockwise direction about the axis 26 results in a corresponding counterclockwise rotation of the control valve drive gear 44 as rotation of the timing drive gear 32 in the counterclockwise direction tightens the grip of the first end 68 of the coupling member on the stem 34 and tightens the grip of the second end 70 of the coupling member 58 on the stem 46 of the control valve drive gear 44.

Figure 4:
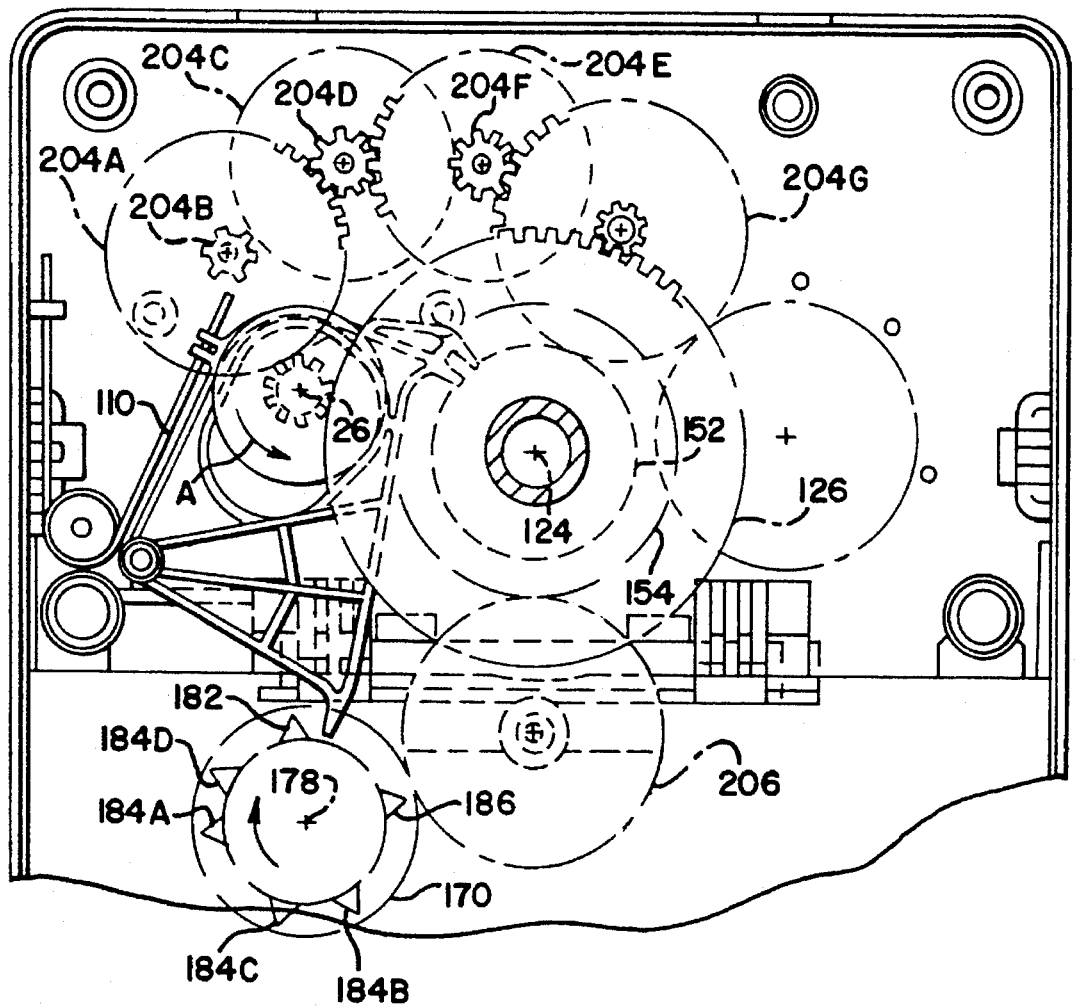
FIG. 4 is a front elevational view of the control mechanism with the cover removed.

The motor 22 rotates the drive shaft 24 and the timing drive gear 32 in a counterclockwise direction as shown by the arrow A in FIG. 4, such that when the actuating member 60 and the first end 68 of the coupling member 58 are free to rotate the coupling member 58 provides a corresponding counterclockwise rotation of the control valve drive gear 44. When the actuating member 60 and first end 68 of the coupling member 50 are prevented from rotation, the coupling member 58 uncouples the control valve drive gear 44 from the timing drive gear 32 such that the timing drive gear 32 may continue to rotate in the counterclockwise direction without producing any corresponding rotation of the control valve drive gear 44.

Figure 3:
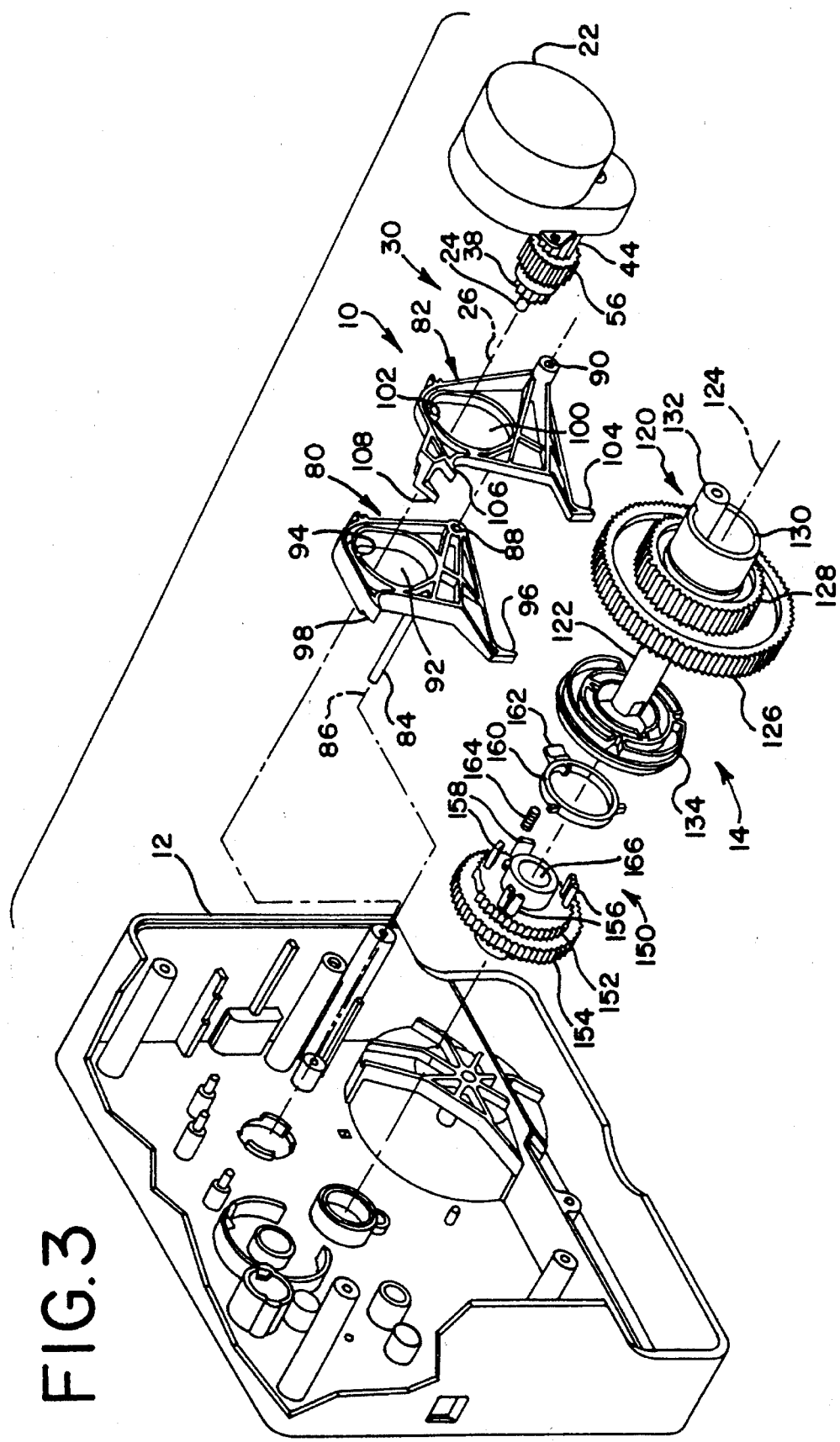
FIG. 3 is a partial exploded view of the control mechanism.

The control mechanism 10 also includes a first cam arm 80 and a second cam arm 82 shown in FIG. 3. The cam arms 80 and 82 are pivotally attached to the housing 12 by an elongate pin 84 having a longitudinal axis 86. The pin 84 extends through a bore 88 in the first cam arm 80 and through a bore 90 in the second cam arm 82. The first cam arm 80 includes a large aperture 92 and an inner finger 94 which projects inwardly into the aperture 92. The first cam arm 80 also includes a first outer finger 96 and a second outer finger 98 which project outwardly from the cam arm 80.

The second cam arm 82 includes a large aperture 100 and an inner finger 102 which projects inwardly into the aperture 100. The second cam arm 82 also includes a first outer finger 104, a second outer finger 106, and a third outer finger 108 all of which project outwardly from the second cam arm 82. The actuating member 60 is located within the aperture 92 of the first cam arm 80 and also within the aperture 100 of the second cam arm 82. Each of the cam arms 80 and 82 are individually selectively pivotal about the axis 86 between a first extended position, wherein the inner finger 94 or 102 of the cam arms 80 or 82 are in intermeshing engagement with the gear 64 of the actuating member 60 to prevent rotation of the actuating member 60 and the first end 68 of the coupling member 58, and a second retracted position wherein the fingers 94 or 102 are disengaged from the actuating member 60 to allow rotation of the actuating member 60 and the first end 68 of the coupling member 58.

As best shown in FIG. 4, a spring 110 biases the first cam arm 80 from the second retracted position to the first extended position. A second spring (not shown) similarly biases the second cam arm 82 from the second retracted position to the first extended position.

Figure 5:
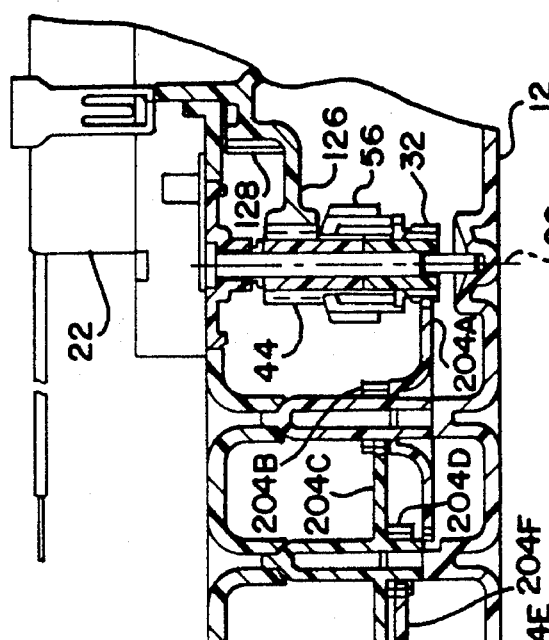
FIG. 5 is a cross-sectional view of the control mechanism showing the gear train.
Figure 7:
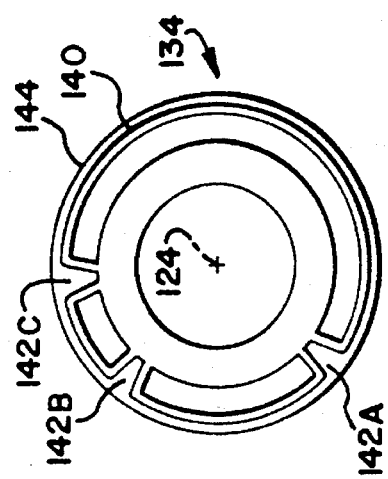
FIG. 7 is a cross-sectional view of the control valve positioning cam of the control mechanism.
Figure 9:
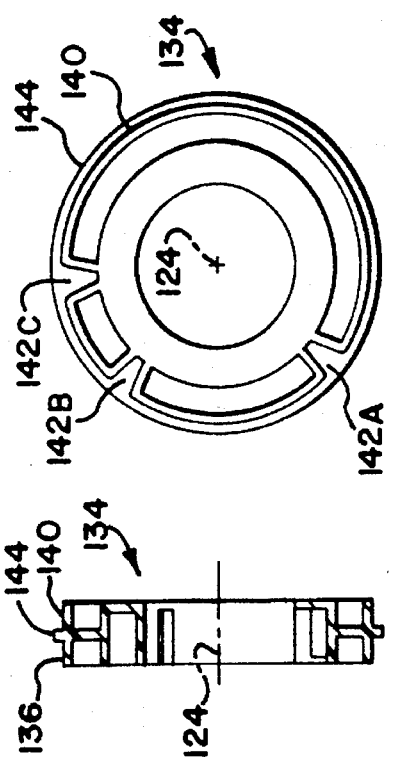
FIG. 9 is a rear view of the control valve positioning cam.
Figure 8:
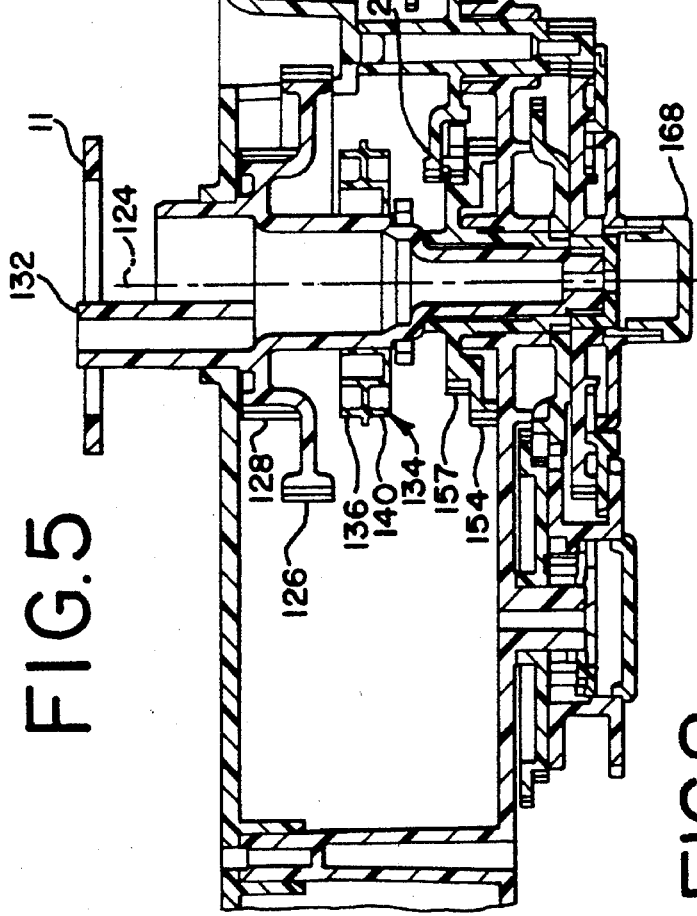
FIG. 8 is a front view of the control valve positioning cam.
Figure 8:
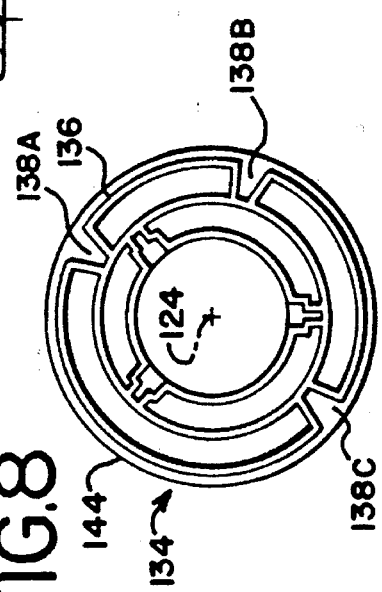

As best shown in FIG. 3, the control valve positioning mechanism 14 includes a main drive assembly 120. The drive assembly 120 includes a shaft 122 having a longitudinal axis 124, a first gear 126 having a plurality of gear teeth and a second gear 128 having a plurality of gear teeth. The first and second gears 126 and 128 are both connected to the shaft 122 for conjoint rotation about the axis 124. A stem 130 projects outwardly from the second gear 128 and includes an eccentrically located hub 132 which rotates about the axis 124. The hub 132 is coupled to the stem of the control valve 11 of the water conditioning system as shown in FIG. 5. As the hub 132 rotates to various different rotational positions about the axis 124, the hub 132 moves the control valve 11 to different positions thereby controlling the operation of the various cycles of the water conditioning system such as the service cycle and the regeneration cycles. A valve positioning cam 134 is removably attached to the gear 126. The valve positioning cam 134, as best shown in FIGS. 7–9, includes a first generally circular indexing face 136 having a plurality of spaced apart generally V- shaped notches 138A–C formed therein. The valve positioning cam 134 also includes a second generally circular indexing face 140 having a plurality of spaced apart generally V- shaped notches 142A–C. A generally circular rim 144 separates the indexing face 136 from the indexing face 140. The notches 138A–C of the indexing face 136 are adapted to receive the first outer finger 96 of the first cam arm 80 when the first cam arm 80 is pivoted to the extended position. The notches 142A–C of the indexing face 140 are adapted to receive the second outer finger 106 of the second cam arm 82 when the second cam arm 82 is pivoted to the extended position. The location of the notches 138A–C and 142A–C each correspond to a location of the control valve 11 and may be located and spaced in the faces 136 and 140 as desired to control the positioning of the control valve 11.

A homing cam assembly 150, as best shown in FIG. 3, includes a first gear 152 and a second gear 154 which is attached to the first gear 152 for conjoint rotation therewith. Two legs 156 extend outwardly from the first gear 152 generally perpendicular thereto. Two spaced apart posts 158 also project outwardly from the first gear 152 generally perpendicular thereto. A generally circular ring 160 is pivotally attached to the end of each leg 156 and includes an outwardly extending tab 162. The tab 162 is located between the posts 158. The ring 160 is pivotal between a first position wherein the ring is generally parallel to the first gear 152 and a second position wherein the ring 160 is located at an angle to the first gear 152 wherein the tab 162 is located further from the first gear 152 than in the first position. A spring 164 biases the ring 160 from the first position towards the second position. A bore 166 extends through the gears 152 and 154. The shaft 122 of the drive assembly 120 extends through the bore 166 such that the homing cam assembly 150 is rotatable with respect to the shaft 122 about the axis 124. The end of the shaft 122 is attached to a knob 168 as best shown in FIG. 5.

Figure 6:
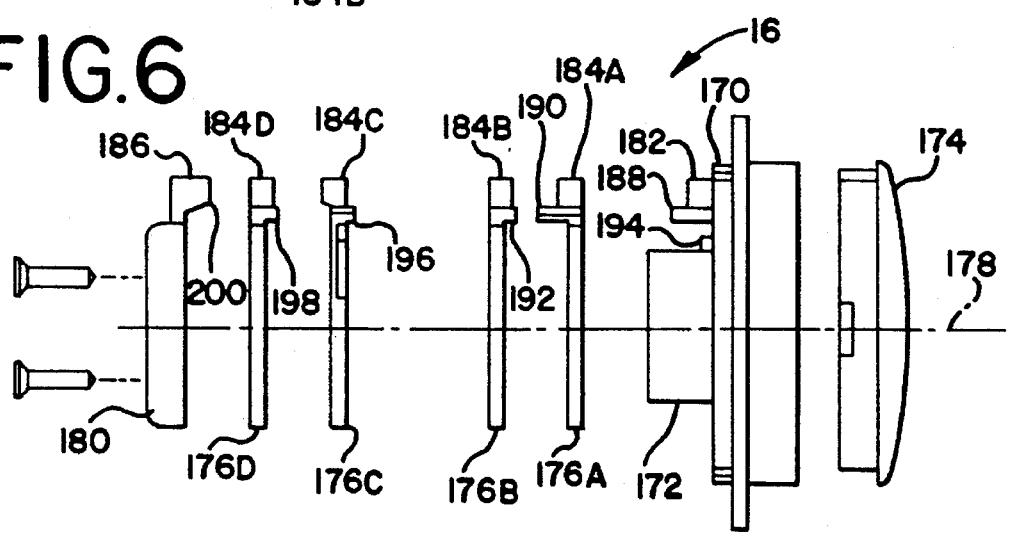
FIG. 6 is an exploded view of the regeneration cycle programming mechanism of the control mechanism.

As best shown in FIG. 6, the regeneration cycle programming mechanism 16 includes a minute gear 170, a generally circular shaft 172 extending concentrically from one side of the minute gear 170, and a knob 174 attached to the other side of the minute gear 170. A plurality of rotationally adjustable cams 176A–D, each in the general shape of an annular ring, are located on the shaft 172 for independent selective rotation about an axis 178. The cams 176A–D are retained on the shaft 172 by a cap 180 which is attached to the minute gear 170. The cap 180 and the minute gear 170 also rotate about the axis 178. The minute gear 170 includes an outwardly projecting finger 182. Each of the cams 176A–D includes a respective outwardly projecting finger 184A–D. The cap 180 includes an outwardly projecting finger 186. The minute gear 170 includes a tab 188 which is adapted to engage the finger 184A. The cam 176A includes a tab 190 which is adapted to engage the fingers 184B–C. The cam 176B includes a tab 192 adapted to engage a post 194 on the minute gear 170. The cam 176C includes a tab 196 which is adapted to engage the finger 184B. The cam 176D includes a tab 198 adapted to engage the finger 184C. The cap 180 includes a tab 200 adapted to engage the fingers 184C–D. The tabs prevent the fingers from one cam from passing an adjacent cam finger as the cams are selectively rotated.

Each of the cams 176A–D is selectively rotatable about the axis 178 to position the respective fingers 184A–D in a desired position. The distance between the finger 182 and the finger 184D determines the length of time the backwash portion of the regeneration cycle operates. The distance between the fingers 184D and 184A determines the length of time the brine and slow rinse portion of the regeneration cycle operates. The distance between the finger 184A and the finger 184C determines the length of time the rapid rinse cycle operates. The distance between the finger 184C and 184B determines the length of time the brine tank refill cycle operates. The finger 186 of the cap 180 is fixed in relation to the minute gear 170 and is adapted to return the control valve 11 to the service position. The fingers 182, 184A and 184B are adapted to engage the first outer finger 96 of the first cam arm 80 when the first cam arm 80 is in the extended position to pivot the first cam arm 80 to the retracted position. The fingers 184C, 184D and 186 are adapted to engage the first outer finger 104 of the second cam arm 82 when the second cam arm 82 is in the first extended position to pivot the second cam arm 82 to the retracted position.

The timing drive gear 32 is in driving engagement with the first gear 152 of the homing cam assembly 150 through a drive train including a plurality of gears 204A–G as shown in FIG. 4 such that rotation of the timing drive gear 32 provides rotation of the homing cam assembly 150. The second gear 154 of the homing cam assembly 150 is in driving engagement with a gear 206. The gear 206 is in driving engagement with the minute gear 170 of the regeneration cycle programming mechanism 16. The timing drive gear 32 is thereby in driving engagement with the minute gear 170 through the gears 204A–G, the gears 152 and 154 of the homing cam assembly 150, and the gear 206. The control valve drive gear 44 is in driving engagement with the first gear 126 of the drive assembly 120.

In operation, the second outer finger 98 and the second outer finger 106 of the cam arms 80 and 82 are pivotally biased into engagement with the valve positioning cam 134 by the springs 110. When the second outer finger 98 of the first cam arm 80 is located within a notch 138A–C, the second outer finger 106 of the second cam arm 82 is biased against the indexing face 140 of the valve positioning cam 134. Conversely, when the second outer finger 106 of the second cam arm 82 is located within a notch 142A–C of the valve positioning cam 134, the second outer finger 98 of the first cam arm 80 is biased against the indexing face 136 of the valve positioning cam 134. When the second outer finger 98 of the first cam arm 80 is located within a notch 138A–C, the inner finger 94 engages the gear 64 of the clutch 56 to prevent rotation of the first end 68 of the coupling member 58 such that rotation of the timing drive gear 32 does not cause a corresponding rotation of the control valve drive gear 44. Similarly, when the second outer finger 106 of the second cam arm 82 is located within a notch 142A–C, the inner finger 102 engages the gear 64 of the clutch 56 to prevent rotation of the first end 68 of the coupling member 58 such that rotation of the timing drive gear 32 does not cause a corresponding rotation of the control valve drive gear 44.

The electric motor 22 causes the drive shaft 24 and the attached timing drive gear 32 to rotate in a counterclockwise direction as indicated by the arrow A in FIG. 4. The rotation of the timing drive gear 32 rotatably drives the gears 204A–G which in turn rotatably drive the homing cam assembly 150 to rotate about the axis 124. The rotation of the homing cam assembly 150 drives the gear 206 and the minute gear 170 of the regeneration cycle programming mechanism 16. When a regeneration cycle is to be initiated, the minute gear 170 rotates about the axis 178 such that the finger 182 engages the first outer finger 96 of the first cam arm 80 and pivots the cam arm 80 about the axis 86 to the retracted position wherein the second outer finger 98 is disengaged from the notch 138A of the valve positioning cam 134 and the inner finger 94 is disengaged from the clutch 56. Simultaneously, the second outer finger 106 of the second cam arm 82 is biased against the indexing face 140 of the valve positioning cam 134 such that the inner finger 102 is also disengaged from the clutch 56. The clutch 56 is thereby free to rotate such that the control valve drive gear 44 rotates conjointly with the timing drive gear 32. Rotation of the control valve drive gear 44 rotates the first gear 126 of the drive assembly 120 and the valve positioning cam 134 attached thereto, and repositions the valve 11. The valve positioning cam 134 rotates until the second outer finger 106 of the second cam arm 82 pivots into a notch 142A–C of the valve positioning cam 134 wherein the inner finger 102 engages the clutch 56 thereby stopping rotation of the control valve drive gear 44 and the drive assembly 120 and stopping movement of the control valve 11 attached thereto.

As the minute gear 170 continues to rotate, the finger 184D of the cam 176D will next engage the first outer finger 104 of the second cam arm 82 thereby pivoting the second outer finger 106 out of engagement with the notch 142A–C of the valve positioning cam 134 and disengaging the inner finger 102 from the clutch 56. The first cam arm 80 is in the retracted position with the second outer finger 98 being biased against the indexing face 136. As the clutch 56 is again free to rotate, the control valve drive gear 44 rotates conjointly with the timing drive gear 32. The control valve drive gear 44 rotates the drive assembly 120 until the second outer finger 98 of the first cam arm 80 engages a notch 138A–C in the valve positioning cam 134 wherein the inner finger 94 engages the clutch 56 stopping rotation of the control valve drive gear 44.

The cam arms 80 and 82 continue alternating in their engagement with the notches in the valve positioning cam 134 and are alternately pivoted to their retracted positions in sequence by the fingers 184A, 184C, and 184B of the regeneration cycle programming mechanism 16 until the entire regeneration process is completed and the valve 11 is returned to the service position by the finger 186. The third outer finger 108 of the second cam arm 82 is engaged by the tab 162 of the homing cam assembly 150 to retain the second cam arm 82 in the retracted position to prevent engagement of the inner finger 102 with the clutch 56 as the control valve drive gear 44 returns the control valve 11 to the service position.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A drive mechanism for a water conditioning system control mechanism having a drive shaft, a regeneration cycle programming mechanism and a control valve positioning mechanism, said drive mechanism including:

a timing drive gear adapted to be rotationally driven by the drive shaft, said timing drive gear including a plurality of first gear teeth adapted to drive the regeneration cycle programming mechanism, and a first stem attached to said first gear teeth for conjoint rotation therewith;

a control valve drive gear including a plurality of second gear teeth adapted to selectively drive the control valve positioning mechanism, and a second stem attached to said second gear teeth for conjoint rotation therewith;

a clutch selectively coupling said control valve drive gear to said timing drive gear to provide selective conjoint rotation of said control valve drive gear with said timing drive gear, said clutch comprising a coupling member having a first end and a second end, said first end of said coupling member being wrapped around said first stem of said timing drive gear and said second end being wrapped around said second stem of said control valve drive gear;

a first cam arm selectively pivotal between a retracted position and an extended position, said first cam arm engaging said clutch to prevent conjoint rotation of said first end of said coupling member with said timing drive gear when said first cam arm is pivoted to said extended position;

whereby as the drive shaft rotates said timing drive gear, said first end of said coupling member grips said first stem of said timing drive gear and said second end of said coupling member grips said second stem of said control valve drive gear such that said coupling member couples said control valve drive gear to said timing drive gear for conjoint rotation, and whereby when said first end of said coupling member is prevented from rotating conjointly with said timing drive gear, said timing drive gear rotates independently of said control valve drive gear.

2. The drive mechanism of claim 1 wherein said clutch includes an actuating member extending around said coupling member, said first end of said coupling member being attached to said actuating member.

3. The drive mechanism of claim 2 wherein said actuating member includes a gear.

4. The drive mechanism of claim 1 wherein said coupling member comprises a coil spring.

5. The drive mechanism of claim 1 including a second cam arm selectively pivotal between a retracted position and an extended position, said second cam arm engaging said clutch to prevent rotation of said first end of said coupling member in said extended position.

6. A control mechanism for operating a control valve in a water conditioning system including:

a drive mechanism including a timing drive gear, a control valve drive gear, and a clutch for selectively coupling said control valve drive gear to said timing drive gear such that when said clutch is free to rotate said clutch couples said control valve drive gear to said timing drive gear for conjoint rotation and such that when said clutch is prevented from rotation said clutch uncouples said control valve drive gear from said timing drive gear whereby said timing drive gear rotates independently of said control valve drive gear;

a rotatable positioning cam having an indexing face including a plurality of notches, said positioning cam being in driving engagement with said control valve drive gear and adapted to be connected to the control valve such that said positioning cam operates the control valve in response to the rotational movement of said positioning cam;

a first cam arm selectively pivotal between a retracted position and an extended position, said first cam arm including a first finger adapted to engage said clutch and prevent rotation of said clutch when said first cam arm is in said extended position, and a second finger adapted to engage said indexing face of said positioning cam when said first cam arm is in said retracted position and to pivot into a notch in said indexing face when a notch rotates into alignment with said second finger thereby permitting said first cam arm to pivot to said extended position; and a timing mechanism driven by said timing drive gear, said timing mechanism including a plurality of spaced apart fingers, said fingers being rotatable about an axis such that each said finger sequentially engages and disengages from said first cam arm as said fingers rotate, said fingers pivoting said first cam arm to said retracted position when said first cam arm is engaged by a finger;

whereby when said first cam arm is pivoted to said retracted position by said fingers of said timing mechanism said timing drive gear rotates said control valve drive gear and rotates said notches of said positioning cam out of alignment with said second finger of said first cam arm such that when said fingers of said timing mechanism disengage from said first cam arm said second finger of said cam arm engages said indexing face of said positioning cam and thereby remains in said retracted position until a notch in said positioning cam rotates into alignment with said second finger of said first cam arm.

7. The control mechanism of claim 6 including a second cam arm selectively pivotal between a retracted position and an extended position, said second cam arm including a third finger adapted to engage said clutch and prevent rotation of said clutch when said second cam arm is in said extended position, and a fourth finger adapted to engage said indexing face of said positioning cam when said second cam arm is in said retracted position and to pivot into a notch in said indexing face when a notch rotates into alignment with said fourth finger thereby permitting said second cam arm to pivot to said extended position.

* * * * *